(12) United States Patent
Nagahara (10) Patent No.: US 6,639,738 B2
(45) Date of Patent: Oct. 28, 2003

(54) IMAGING LENS (75) Inventor: Akiko Nagahara, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/290,263

(22) Filed: Nov. 8, 2002

(65) Prior Publication Data
US 2003/0076584 A1 Apr. 24, 2003

Related U.S. Application Data (63) Continuation of application No. 09/048,287, filed on Mar. 26, 1998, now abandoned.

(30) Foreign Application Priority Data

May 21, 1997 (JP) ............................................. 9-147156

(51) Int. Cl.$^7$ ............................ G02B 9/12; G02B 21/02
(52) U.S. Cl. ................. 359/784; 359/656; 359/661; 359/645
(58) Field of Search ................................. 359/362, 432, 359/656, 716, 784, 708, 661–664, 735, 748, 790, 651, 435

(56) References Cited

U.S. PATENT DOCUMENTS 3,893,752 A * 7/1975 Tojyo ......................... 359/661
4,623,224 A * 11/1986 Clarke ......................... 359/645
5,202,795 A * 4/1993 Kashima ..................... 359/645

FOREIGN PATENT DOCUMENTS

| JP | 4-56814    | * | 2/1992  |
| JP | 4-270309   | * | 9/1992  |
| JP | 10-206730  | * | 8/1998  |
| JP | 63-318514  | * | 12/1998 |

OTHER PUBLICATIONS

Heavens, O.S. et al, Insight into Optics, 1$^{st}$ edition, 1991, pp. 211–213.*
Born, Max et al, Principles of Optics, 6$^{th}$ (corrected) edition, 1980, pp. 235, 239, 242–243.*

* cited by examiner

Primary Examiner—Thong Nguyen
(74) Attorney, Agent, or Firm—Snider & Associates; Ronald R. Snider

(57) ABSTRACT

In an imaging lens made of three lens sheets, the second and third lenses from the object side are shaped substantially similar to each other, thereby reducing the manufacturing cost while improving resolution. The first lens $L_1$ is a biconcave lens having a surface with a stronger curvature directed onto the object side. Each of the second lens $L_2$ and third lens $L_3$ is a biconvex lens having a surface with a stronger curvature directed onto the imaging surface side, while the second lens $L_2$ and third lens $L_3$ have the same form. As the second lens $L_2$ and third lens $L_3$ have the same form, the cost of manufacturing the imaging lens can be reduced, though being constituted by three sheets of lenses.

7 Claims, 9 Drawing Sheets

EXAMPLE 1

FIG.2
EXAMPLE 2

FIG. 3
EXAMPLE 3

FIG.4C EXAMPLE 1 ω=34.8°

FIG.4B EXAMPLE 1 ω=34.8°

FIG.4A EXAMPLE 1 F/2.05

FIG. 5

EXAMPLE 1 (COMA)

$\omega = 0°$

$\omega = 13.6°$

$\omega = 20.9°$ $\omega = 28.8°$

$\omega = 34.8°$

FIG.7

EXAMPLE 2 (COMA)
ω = 0°

ω = 13.8°

ω = 21.1°

ω = 29°

ω = 34.6°

FIG. 9
EXAMPLE 3 (COMA)

$\omega = 0°$ $\omega = 13°$ $\omega = 20°$ $\omega = 27.7°$ $\omega = 37.0°$

IMAGING LENS

RELATED APPLICATIONS

This application claims the priority of Japanese Patent Application No. 9-147156 filed on May 21, 1997, which is incorporated herein by reference. This application is a Continuation of application Ser. No. 09/048,287, filed on Mar. 26, 1998, now abandoned.

BACKGROUND OF THE INVENTION

1. Field of the Invention

The present invention relates to an imaging lens and, in particular, to an imaging lens suitable as a taking lens for a video camera, still video camera, or the like used for TV phone, door phone, monitoring purposes, and so forth.

2. Description of the Prior Art

Recently, solid-state imaging devices have often been disposed on imaging surfaces of various kinds of video cameras and still video cameras. With the advance of technology, such solid-state imaging devices have been reducing their size year by year, while requiring imaging lenses with smaller size and wider angle of view.

Also, there is a strong demand for high brightness and low cost.

Known as such an imaging lens is the one made of two sheets of lenses disclosed in a commonly-assigned application (Japanese Patent Application No. 9-25900).

In the case where there is a demand for further improving resolution, it is desirable that three sheets of lenses be used instead of two.

When such an imaging lens is made of three sheets of lenses, however, due to the increase in the number of lens sheets, it becomes difficult to achieve the aimed object of lowering cost.

SUMMARY OF THE INVENTION

In view of these circumstances, it is an object of the present invention to provide a small-size, bright imaging lens having a wide angle of view, which can restrain the manufacturing cost from increasing while being constituted by three sheets of lenses.

The imaging lens in accordance with the present invention comprises, successively from an object side, a negative power lens, a first biconvex lens, and a second biconvex lens, in which the first and second biconvex lenses have forms substantially similar to each other while each having at least one aspheric surface.

Preferably, the first and second biconvex lenses are made of a plastic material.

DESCRIPTION OF THE PREFERRED EMBODIMENTS

In the following, embodiments of the present invention will be explained with reference to Examples 1 to 3.

Example 1

Figure 1:
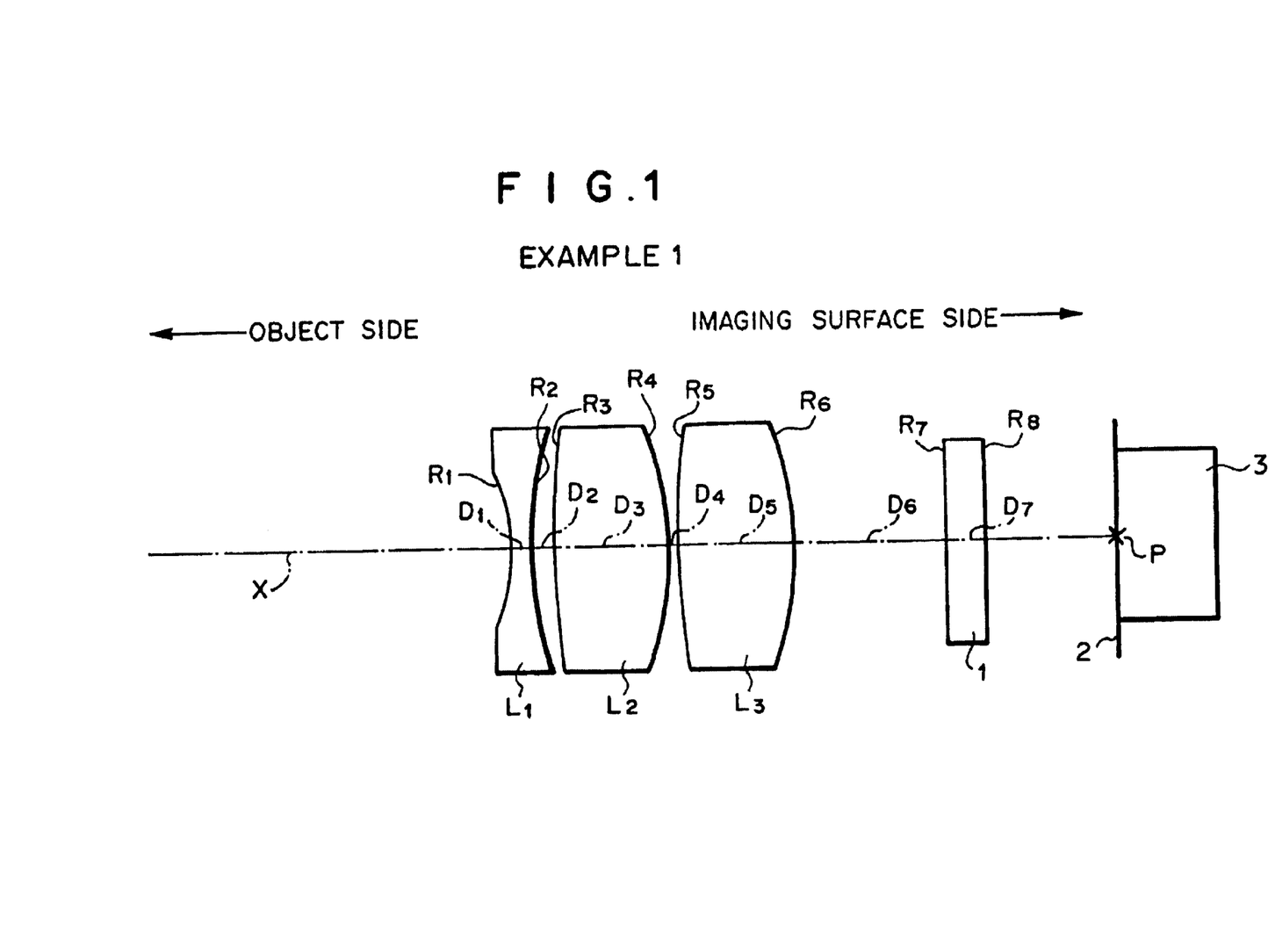
FIG. 1 is a schematic view showing the basic lens configuration in accordance with Example 1 of the present invention.

FIG. 1 shows the basic lens configuration of Example 1. As shown in FIG. 1, the imaging lens in accordance with Example 1 is constituted by three sheets of lenses $L_1$, $L_2$, and $L_3$, whereas a stop (not depicted) is disposed immediately downstream the imaging surface side of the third lens, whereby a luminous flux incident on the imaging lens along optical axis X from the object side forms an image at imaging position P on imaging surface 2 of a solid-state imaging device 3. Here, filter section 1 including low-pass filter, infrared filter, and the like are disposed between the third lens $L_3$ and the imaging surface 2.

The first lens $L_1$ is a biconcave lens having a surface with a stronger curvature directed onto the object side. Each of the second lens $L_2$ and third lens $L_3$ is a biconvex lens having a surface with a stronger curvature directed onto the imaging surface side, while the second lens $L_2$ and third lens $L_3$ have the same form.

As the second lens $L_2$ and third lens $L_3$ have the same form, though the imaging lens is constituted by three sheets of lenses, its manufacturing cost can be made low.

Of the second lens $L_2$ and third lens $L_3$, the surfaces on the object side, i.e., the third and fifth surfaces, are made aspherical.

The lens configuration of Example 1 is of retro-focus type, whereby required back focus can be secured, and a wider angle of view can be attained. Also, as the third and fifth surfaces are made aspherical, while the number of lens sheets is minimized, various kinds of aberration such as spherical aberration, astigmatism, distortion, and coma can be made favorable.

Here, the above-mentioned three sheets of lenses $L_1$, $L_2$, and $L_3$ are made of glass.

The following Table 1 shows radius of curvature R (mm) of each lens surface, center thickness of each lens and air gap between neighboring lenses D (mm), refractive index n of each lens at e-line, and Abbe number ν of each lens in Example 1.

In Table 1, as well as in Tables 3 and 5 which will be explained later, numbers referring to the letters R, D, n, and ν successively increase from the object side. Each surface designated with "*" refers to an aspheric surface, which is represented by the aspheric surface expression of the following Expression 1.

Expression 1

Aspheric surface expression $$Z = CY^2/(1+(1-KC^2Y^2)^{1/2}) + a_4Y^4 + a_6Y^6 + a_8Y^8 + a_{10}Y^{10}$$

C: curvature of apex of aspheric surface
K: conical constant
$a_i$: aspheric surface constant
Y: height from optical axis
Z: distance to a point on the aspheric surface from the tangential plane at the lens surface apex The following Table 2 shows aspheric surface coefficients concerning the above-mentioned aspheric surfaces.

In Example 1, the focal length f of the whole lens system is 5.35 mm, back focus Bf is 8.07 mm, Fno is 2.05, and half angle of view ω is 40.0 degrees.

Example 2

Figure 2:
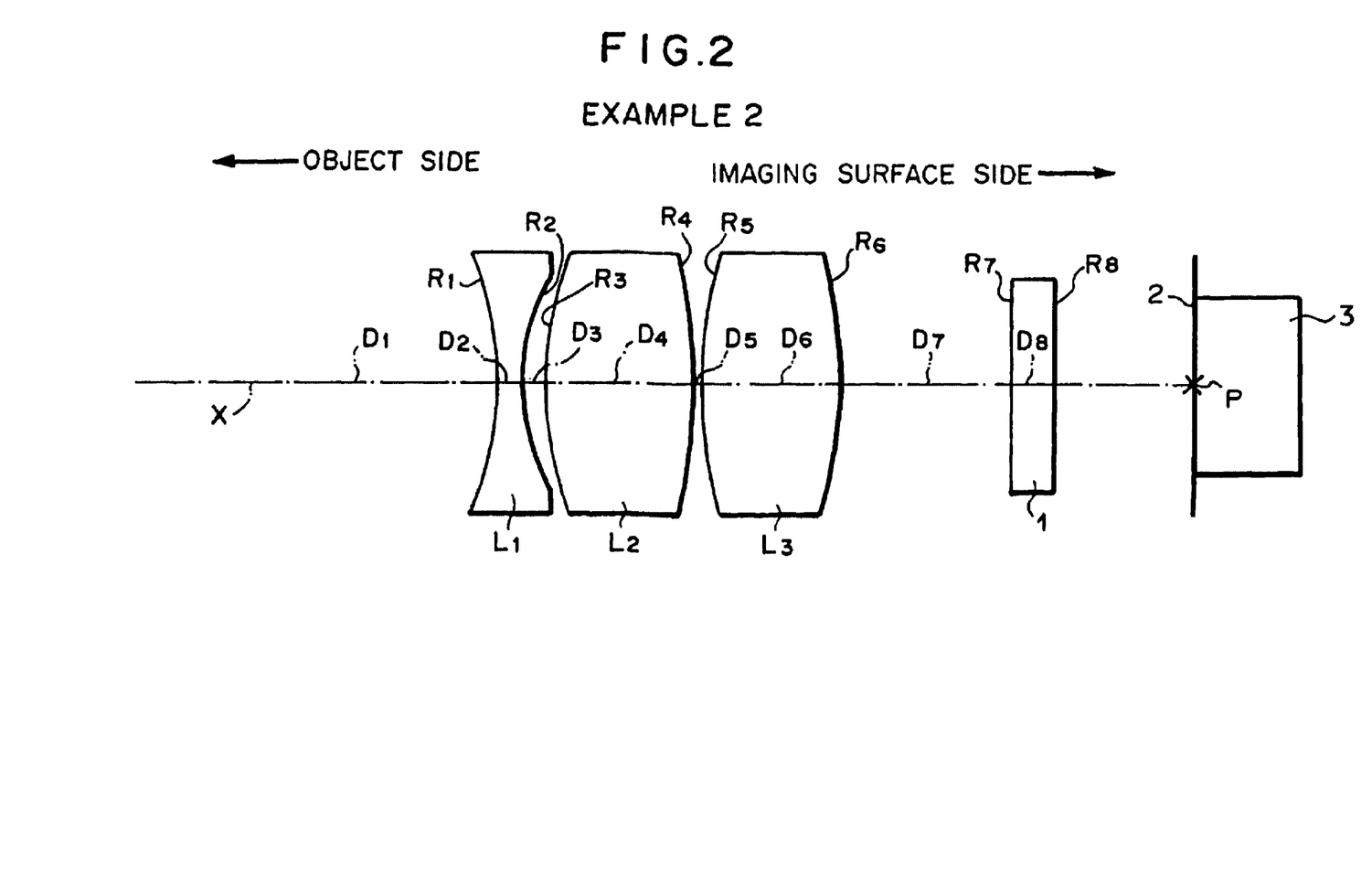
FIG. 2 is a schematic view showing the basic lens configuration in accordance with Example 2 of the present invention.

FIG. 2 shows the basic lens configuration of Example 2. The imaging lens of Example 2 is configured substantially similar to that of Example 1 but differs therefrom in that the first lens $L_1$ has a surface with a stronger curvature directed onto the imaging surface side, and that the surfaces of the second lens $L_2$ and third lens $L_3$ corresponding to each other oppose each other, i.e., the third and sixth surfaces and the fourth and fifth surfaces are respectively curved surfaces having identical forms.

Here, the third and sixth surfaces are made aspherical. The three sheets of lenses $L_1$, $L_2$, and $L_3$ are made of glass. Each aspheric surface is represented by the aspheric surface expression of the above-mentioned Expression 1.

The following Table 3 shows radius of curvature R (mm) of each lens surface, center thickness of each lens and air gap between neighboring lenses D (mm), refractive index n of each lens at e-line, and Abbe number ν of each lens in Example 2.

The following Table 4 shows aspheric surface coefficients concerning the above-mentioned aspheric surfaces.

In Example 2, the focal length f of the whole lens system is 5.26 mm, back focus Bf is 7.95 mm, Fno is 2.05, and half angle of view co is 34.6 degrees.

Example 3

Figure 3:
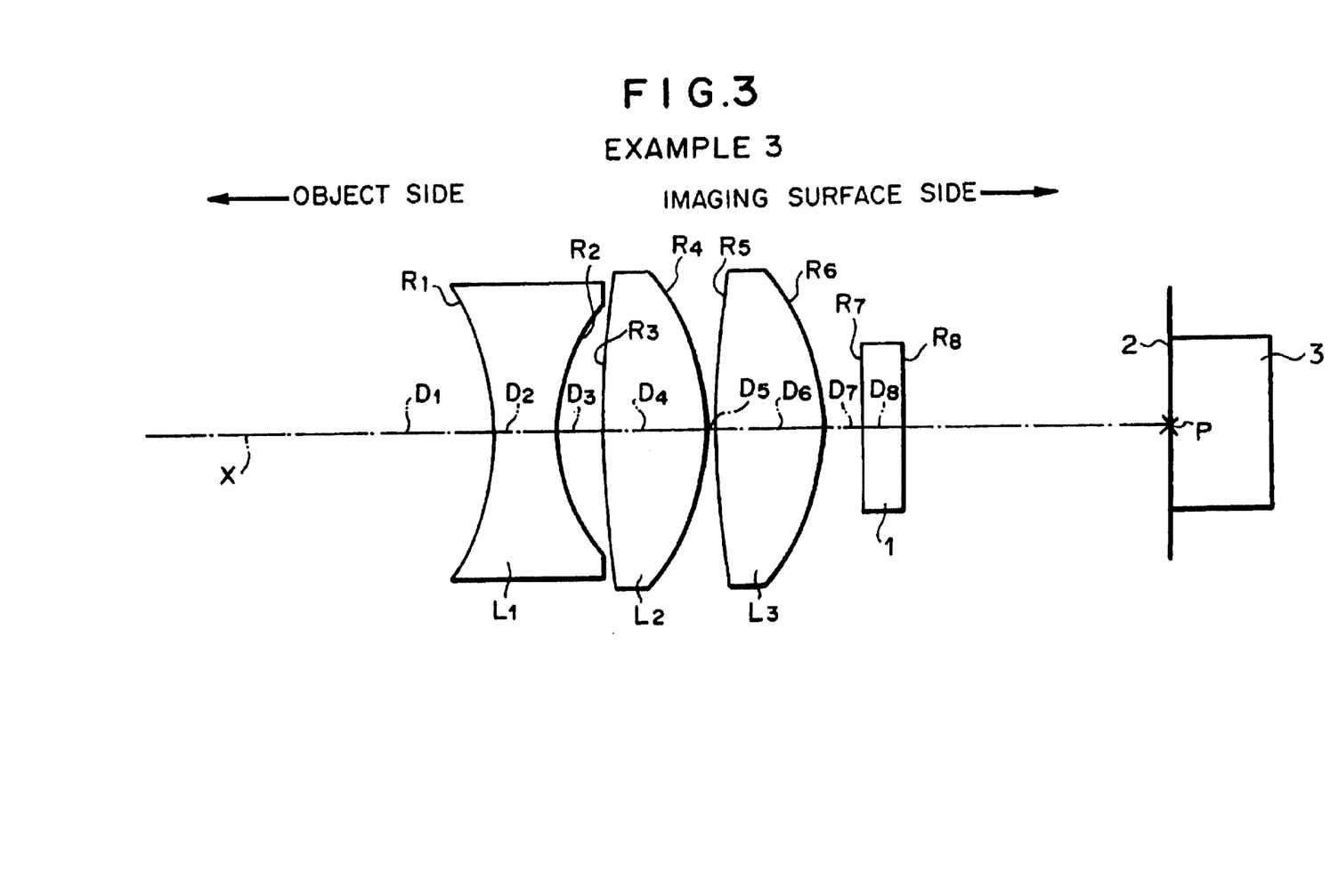
FIG. 3 is a schematic view showing the basic lens configuration in accordance with Example 3 of the present invention.

FIG. 3 shows the basic lens configuration of Example 3. The imaging lens of Example 3 is configured substantially similar to that of Example 1 but differs therefrom in that the first lens $L_1$ has two surfaces with substantially similar curvatures, and that all the lens surfaces are made aspherical. Each aspheric surface is represented by the aspheric surface expression of the above-mentioned Expression 1.

The three sheets of lenses $L_1$, $L_2$, and $L_3$ are made of plastics.

As the three sheets of lenses $L_1$, $L_2$, and $L_3$ are thus made of plastics, the cost of making aspheric surfaces can be reduced.

The following Table 5 shows radius of curvature R (mm) of each lens surface, center thickness of each lens and air gap between neighboring lenses D (mm), refractive index n of each lens at e-line, and Abbe number ν of each lens in Example 3.

The following Table 6 shows aspheric surface coefficients concerning the above-mentioned aspheric surfaces.

In Example 3, the focal length f of the whole lens system is 5.62 mm, back focus Bf is 8.26 mm, Fno is 2.05, and half angle of view ω is 40.0 degrees.

Figure 4A:
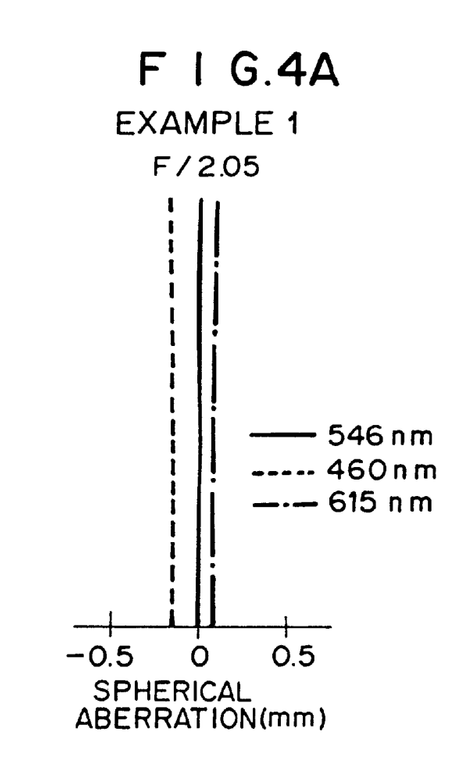
FIGS. 4A, 4B, and 4C are aberration charts (showing spherical aberration, astigmatism, and distortion) of the lens in accordance with Example 1.
Figure 4B:
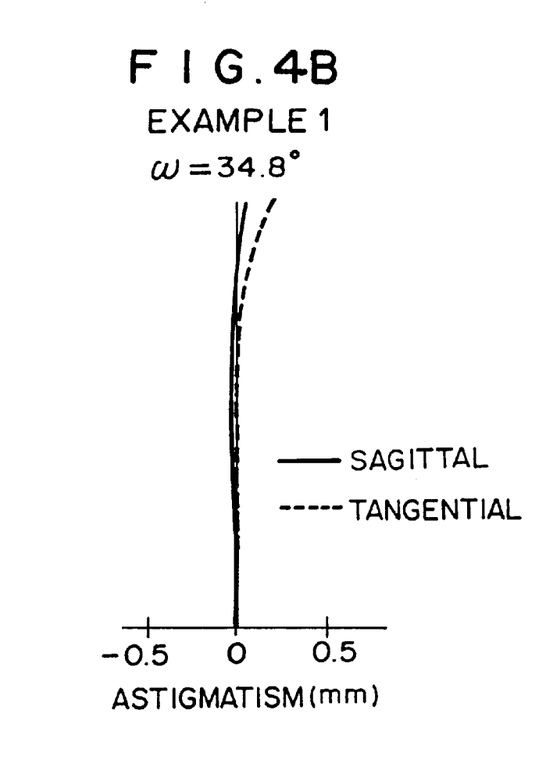
Figure 4C:
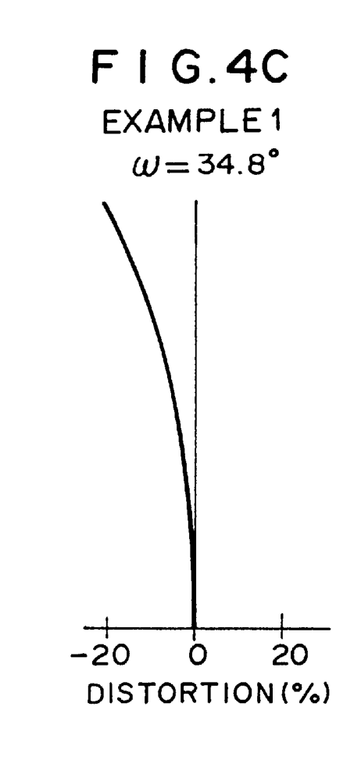
Figure 5:
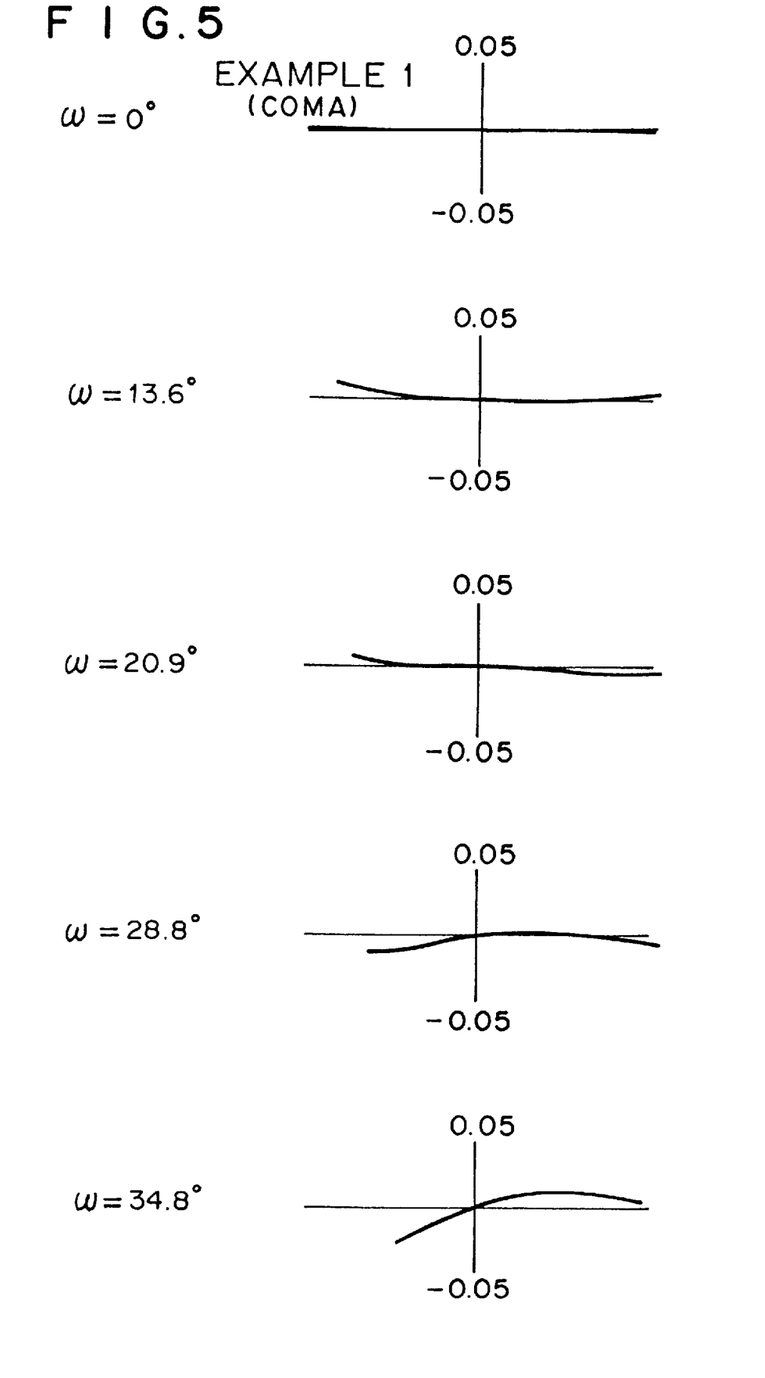
FIG. 5 is an aberration chart (showing coma) of the lens in accordance with Example 1.
Figure 6A:
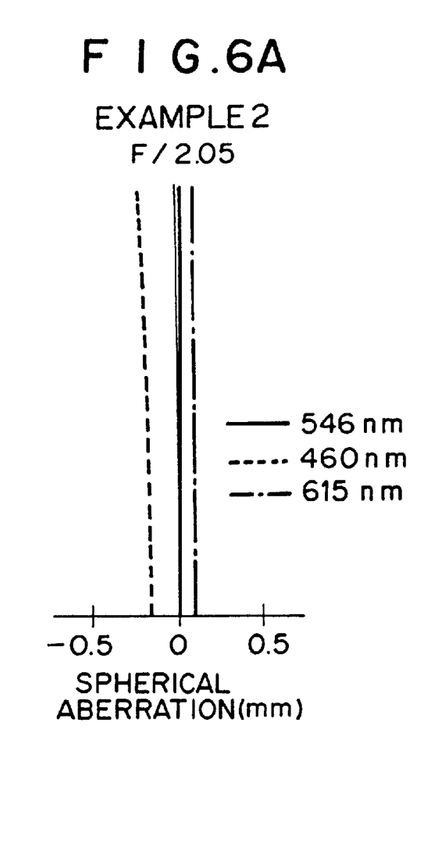
FIGS. 6A, 6B, and 6C are aberration charts (showing spherical aberration, astigmatism, and distortion) of the lens in accordance with Example 2.
Figure 6B:
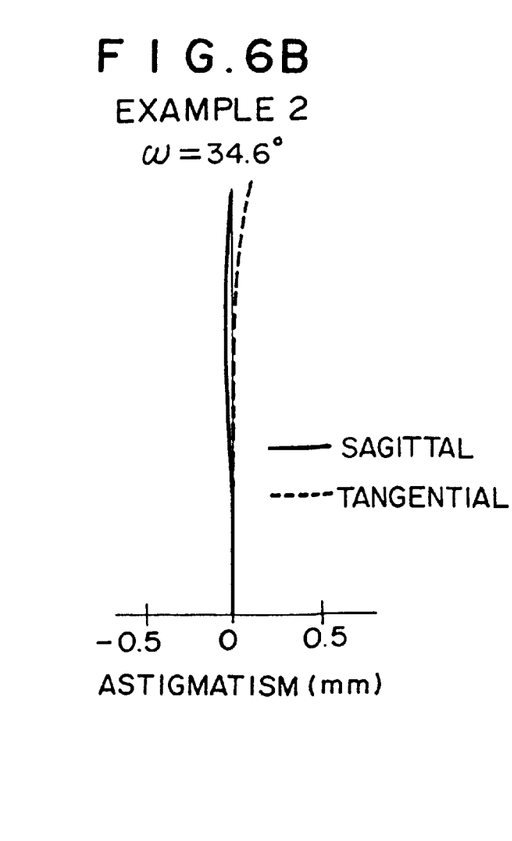
Figure 6C:
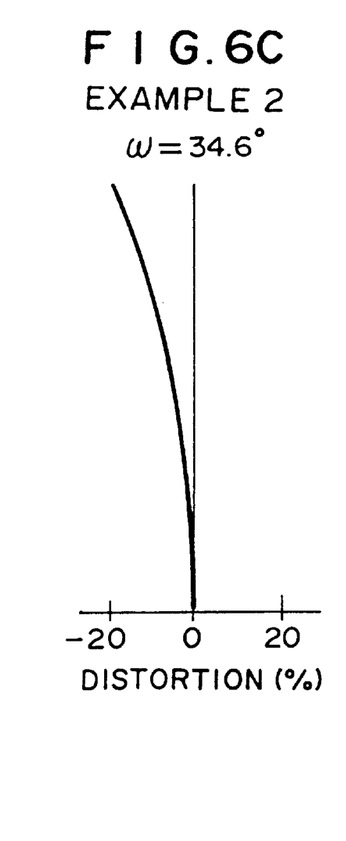
Figure 7:
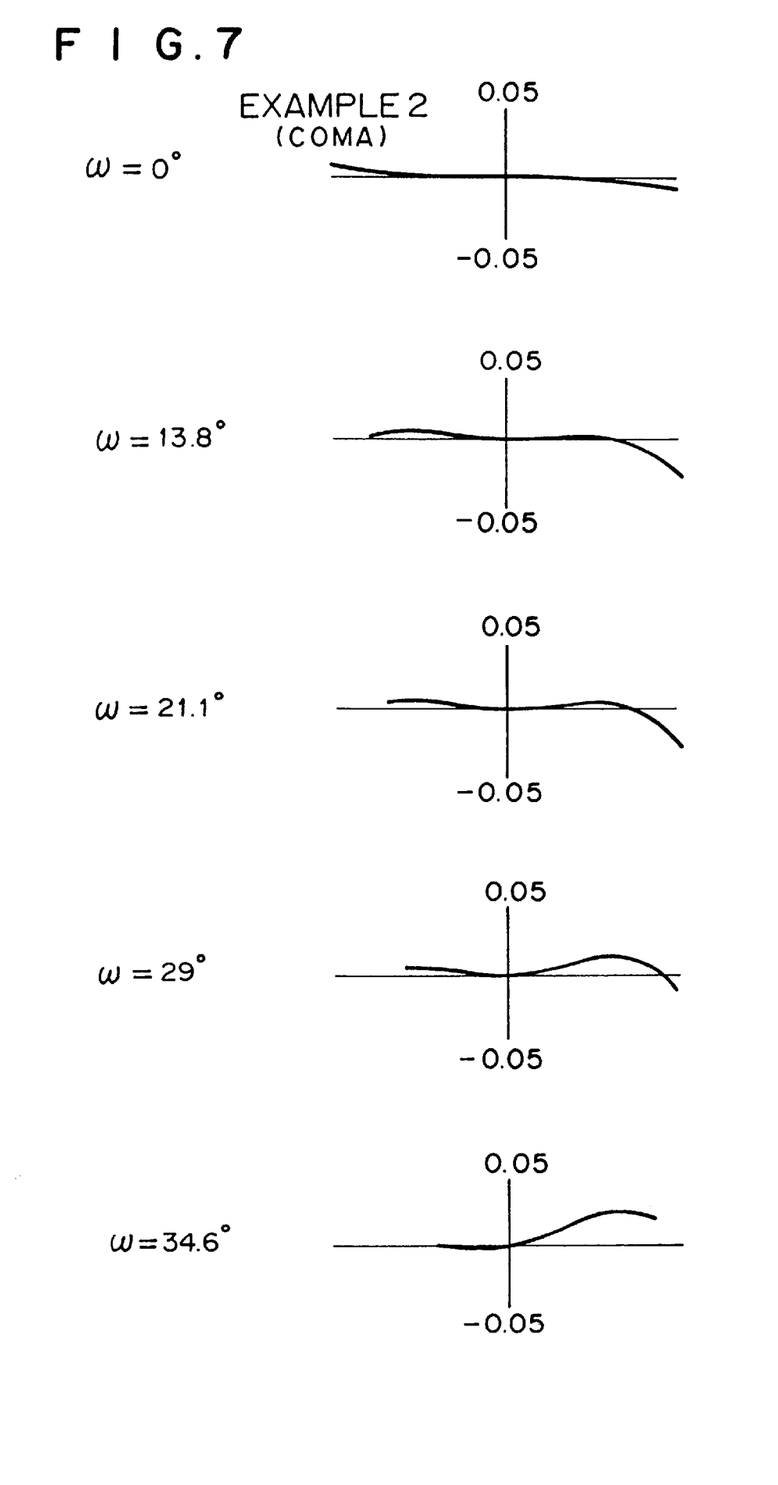
FIG. 7 is an aberration chart (showing coma) of the lens in accordance with Example 2.
Figure 8A:
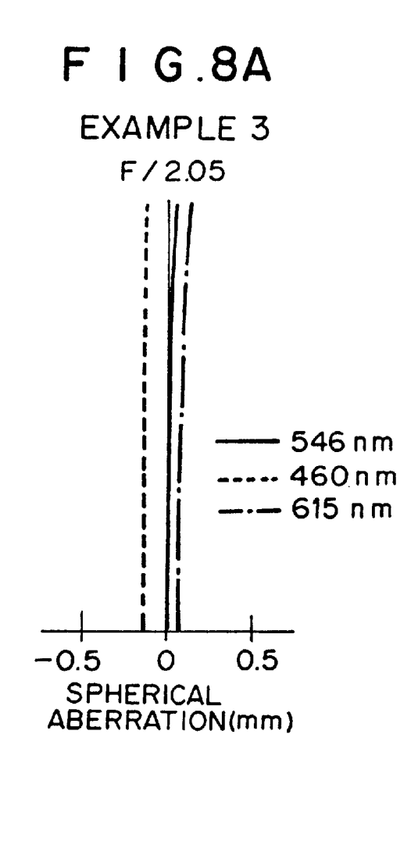
FIGS. 8A, 8B, and 8C are aberration charts (showing spherical aberration, astigmatism, and distortion) of the lens in accordance with Example 3.
Figure 8B:
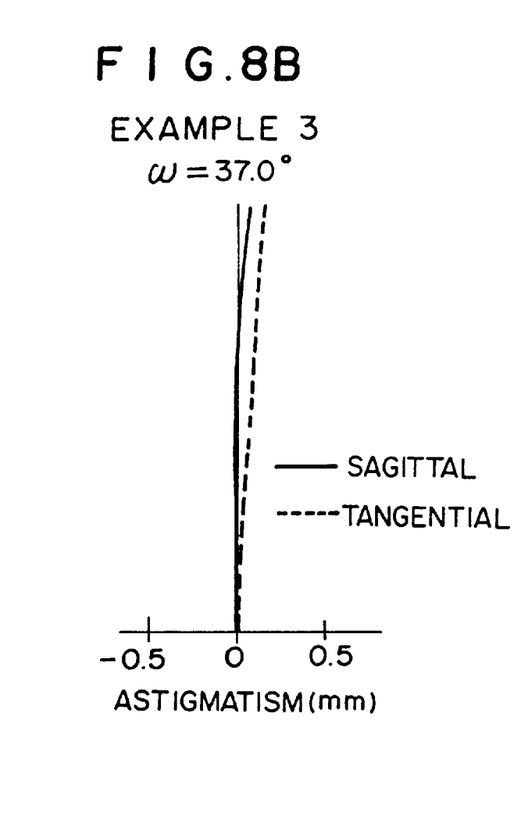
Figure 8C:
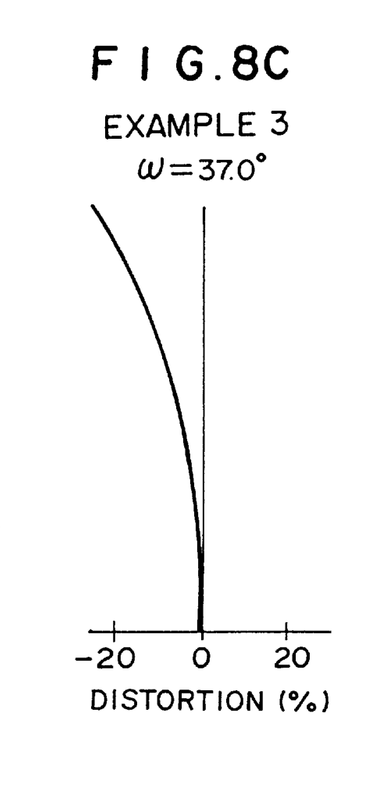
Figure 9:
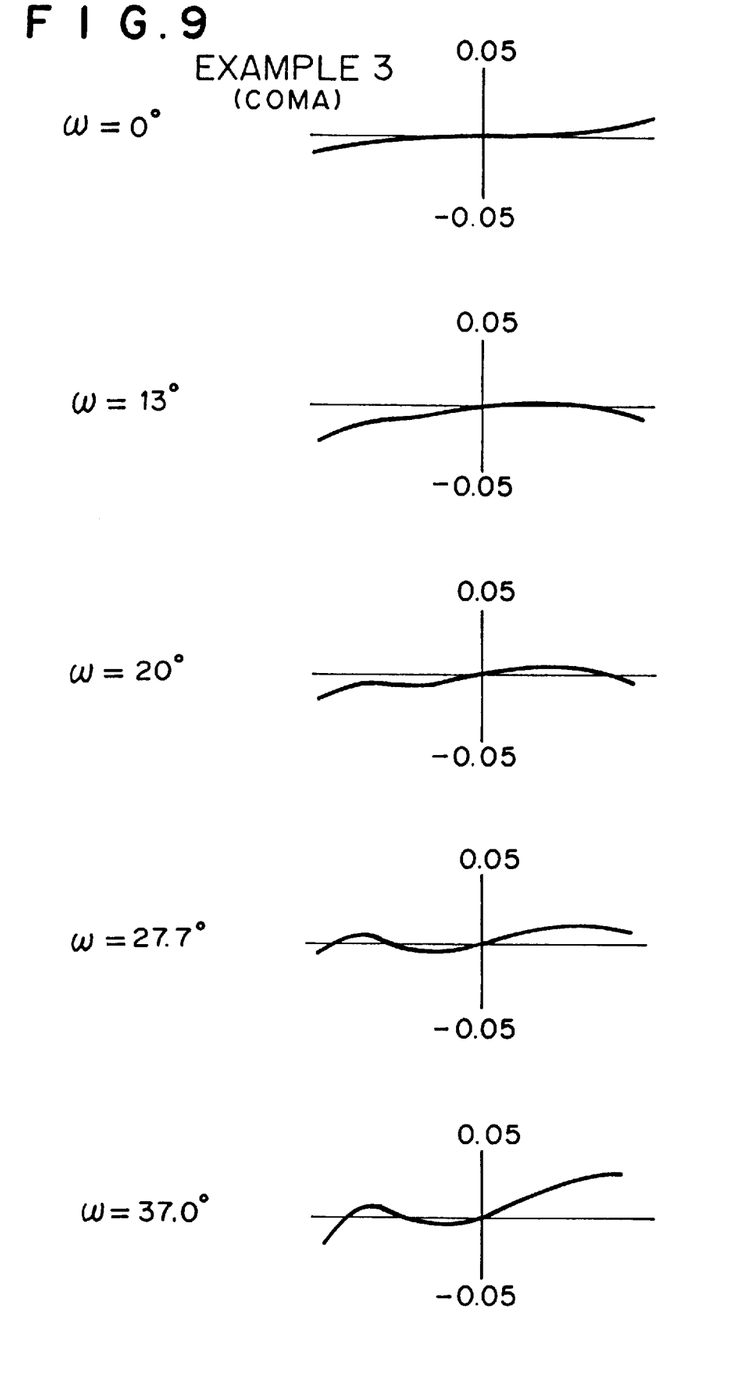
FIG. 9 is an aberration chart (showing coma) of the lens in accordance with Example 3.

FIGS. 4(4A to 4C), 6(6A to 6C), and 8(8A to 8C) show various kinds of aberration (spherical aberration, astigmatism, and distortion) in Examples 1 to 3, respectively; whereas FIGS. 5, 7, and 9 show respective comas in Examples 1 to 3. In these aberration charts, ω indicates half angle of view. As can be seen from FIGS. 4 to 9, each kind of aberration can be made favorable in accordance with the above-mentioned examples.

Between the imaging lens and the light-receiving surface of the solid-state imaging device, a cover glass may be inserted in place of or together with the filter section 1.

As explained in the foregoing, in the imaging lens of the present invention, the biconvex lenses disposed as the second and third lenses from the object side have substantially the same form. Accordingly, though the imaging lens is constituted by three sheets of lenses, it is sufficient to manufacture only two kinds of lenses, whereby the labor and cost for manufacture can be reduced to the same level as those of an imaging lens made of two lens sheets.

The imaging lens in accordance with the present invention is of retro-focus type, whereby required back focus can be secured, and a wider angle of view can be attained. Also, as mentioned above, at least one surface of each of the two biconvex lenses is made aspherical, whereby various kinds of aberration such as spherical aberration, astigmatism, distortion, and coma can be made favorable, while the number of lens sheets is minimized.

Further, when the lenses each having an aspheric surface are made of plastics, the cost of making the aspheric surfaces can be lowered.

TABLE 1

| Surface | R | D | n | ν |
|---|---|---|---|---|
| 1 | −4.823 | 0.6 | 1.83929 | 37.1 |
| 2 | 9.359 | 0.5 | | |
| *3 | 15.182 | 3.1 | 1.79015 | 43.7 |
| 4 | −7.751 | 0.2 | | |
| *5 | 15.182 | 3.1 | 1.79015 | 43.7 |
| 6 | −7.751 | 4.0 | | |
| 7 | ∞ | 1.0 | 1.51825 | 63.8 |
| 8 | ∞ | | | |

TABLE 2

| 3rd surface | K = 1.0 | A4 = −7.014712 × 10⁻⁴ A8 = −2.228049 × 10⁻¹¹ | A6 = −2.582398 × 10⁻⁷ A10 = −2.870346 × 10⁻¹⁴ |
|---|---|---|---|
| 5th surface | K = 1.0 | A4 = −7.014712 × 10⁻⁴ A8 = −2.228049 × 10⁻¹¹ | A6 = −2.582398 × 10⁻⁷ A10 = −2.870346 × 10⁻¹⁴ | f = 5.35 mm   Bf = 8.07 mm   Fno = 2.05   ω = 40.0°

TABLE 3

| Surface | R | D | n | ν |
|---|---|---|---|---|
| 1 | −7.016 | 0.6 | 1.83962 | 42.7 |
| 2 | 4.810 | 0.6 | | |
| *3 | 7.045 | 3.6 | 1.83962 | 42.7 |
| 4 | −15.378 | 0.2 | | |
| 5 | 15.378 | 3.6 | 1.83962 | 42.7 |
| *6 | −7.045 | 4.0 | | |
| 7 | ∞ | 1.0 | 1.51825 | 63.8 |
| 8 | ∞ | | | |

TABLE 4

| | | | |
|---|---|---|---|
| 3rd surface | K = 1.0 | A4 = −8.367068 × 10⁻⁴<br>A8 = 1.720463 × 10⁻¹² | A6 = −7.986729 × 10⁻⁹<br>A10 = 2.941484 × 10⁻¹⁵ |
| 6th surface | K = 1.0 | A4 = 8.367068 × 10⁻⁴<br>A8 = −1.720463 × 10⁻¹² | A6 = 7.986729 × 10⁻⁹<br>A10 = −2.941484 × 10⁻¹⁵ |
| | f = 5.26 mm | Bf = 7.95 mm | Fno = 2.05    ω = 34.6° |

TABLE 5

| Surface | R | D | n | ν |
|---|---|---|---|---|
| *1 | −5.748 | 1.6 | 1.49217 | 57.3 |
| *2 | 5.475 | 1.1 | | |
| *3 | 15.237 | 2.7 | 1.49217 | 57.3 |
| *4 | −5.524 | 0.2 | | |
| *5 | 15.237 | 2.7 | 1.49217 | 57.3 |
| *6 | −5.524 | 4.0 | | |
| 7 | ∞ | 1.0 | 1.51825 | 63.8 |
| 8 | ∞ | | | |

TABLE 6

| | | | |
|---|---|---|---|
| 1st surface | K = 1.0 | A4 = 5.491421 × 10⁻⁴<br>A8 = −2.265144 × 10⁻¹⁰ | A6 = 8.891758 × 10⁻⁷<br>A10 = 2.292715 × 10⁻¹² |
| 2nd surface | K = 1.0 | A4 = 3.796533 × 10⁻³<br>A8 = −1.899757 × 10⁻¹⁰ | A6 = −3.158200 × 10⁻⁷<br>A10 = −6.627839 × 10⁻¹³ |
| 3rd surface | K = 1.0 | A4 = −7.216721 × 10⁻⁴<br>A8 = −3.483494 × 10⁻¹⁰ | A6 = −7.96463 × 10⁻⁷<br>A10 = −7.089969 × 10⁻¹³ |
| 4th surface | K = 1.0 | A4 = −4.793157 × 10⁻⁵<br>A8 = 1.800984 × 10⁻¹⁰ | A6 = 1.096100 × 10⁻⁶<br>A10 = −7.936574 × 10⁻¹³ |
| 5th surface | K = 1.0 | A4 = −7.216721 × 10⁻⁴<br>A8 = −3.483494 × 10⁻¹⁰ | A6 = −7.96463 × 10⁻⁷<br>A10 = −7.089969 × 10⁻¹³ |
| 6th surface | K = 1.0 | A4 = −4.793157 × 10⁻⁵<br>A8 = 1.800984 × 10⁻¹⁰ | A6 = 1.096100 × 10⁻⁶<br>A10 = −7.936574 × 10⁻¹³ |
| | f = 5.62 mm | Bf = 8.26 mm | Fno = 2.05    ω = 40.0° |

What is claimed is:

1. An imaging lens consisting of only three lenses successively from an object side, a negative power lens, a first biconvex lens, and a second biconvex lens, said first and second biconvex lenses having forms substantially similar to each other while each having at least one aspheric surface and wherein a real image of an object is formed on an imaging surface of an imaging device through said three lenses.

2. An imaging lens according to claim 1, wherein said first and second biconvex lenses are made of a plastic material.

3. An imaging lens according to claim 1, wherein said first and second biconvex lenses are made of a same material.

4. A solid-state device imaging lens consisting of only three lenses successively from an object side, a negative power lens, a first biconvex lens, and a second biconvex lens, said first and second biconvex lenses having forms substantially similar to each other while each having at least one aspheric surface and wherein a real image of an object is formed on an imaging surface of the solid state device through said three lenses.

5. A solid-state device imaging lens according to claim 4, wherein said lenses comprise a retro-focus type lens configuration.

6. An imaging lens according to claim 4, wherein said first and second biconvex lenses are made of a plastic material.

7. An imaging lens according to claim 4, wherein said first and second biconvex lenses are made of a same material.

* * * * *